United States Patent [19]

Maus et al.

[11] Patent Number: 5,197,188
[45] Date of Patent: Mar. 30, 1993

[54] PROCESS FOR PRODUCING ASSEMBLED CRANKSHAFTS BY EXPANDING SLEEVES ARRANGED IN DIVIDED JOURNALS

[75] Inventors: Wolfgang Maus; Helmut Swars, both of Bergisch Gladbach, Fed. Rep. of Germany

[73] Assignee: Mannesmann Aktiengesellschaft, Dusseldorf, Fed. Rep. of Germany

[21] Appl. No.: 662,392

[22] Filed: Feb. 27, 1991

Related U.S. Application Data

[63] Continuation of Ser. No. 268,229, Nov. 7, 1988, abandoned.

[30] Foreign Application Priority Data

Nov. 5, 1987 [DE] Fed. Rep. of Germany ....... 3737600

[51] Int. Cl.⁵ .............................................. B21D 31/00
[52] U.S. Cl. .................................. 29/888.08; 29/6.01; 29/421.1; 29/523; 72/58
[58] Field of Search ............. 29/6.01, 447, 523, 421.1, 29/888.08, 890.03, 890.031, 890.036; 74/597, 598; 72/58

[56] References Cited

U.S. PATENT DOCUMENTS

| | | | |
|---|---|---|---|
| 359,290 | 3/1887 | Stanwood | 74/598 |
| 2,013,039 | 9/1935 | Dusevoir | 74/598 |
| 2,151,624 | 3/1939 | Smith-Clarke | 74/598 |
| 3,388,616 | 6/1968 | Kume | 74/597 |
| 4,007,699 | 2/1977 | Clemens | 113/118 C |
| 4,125,937 | 11/1978 | Brown et al. | 20/727 |
| 4,332,073 | 6/1982 | Yoshida et al. | 29/447 X |
| 4,622,864 | 11/1986 | Fetouh | 74/597 |
| 4,847,967 | 7/1989 | Gaudin | 29/890.031 |
| 4,901,551 | 2/1990 | Widart | 29/523 X |
| 5,014,572 | 5/1991 | Swars | 29/888.08 |

FOREIGN PATENT DOCUMENTS

| | | | |
|---|---|---|---|
| 167549 | 7/1950 | Austria | 74/597 |
| 834771 | 12/1938 | France | |
| 271211 | 5/1927 | United Kingdom | 74/598 |
| 551901 | 3/1940 | United Kingdom | |

Primary Examiner—Joseph M. Gorski
Assistant Examiner—S. Thomas Hughes
Attorney, Agent, or Firm—Anderson Kill Olick & Oshinsky

[57] ABSTRACT

In the case of this process, the crankshaft is assembled from individual formed pieces each comprising a crank web and two journal projections. Journal parts belonging together are slid onto a joint sleeve which is plastically deformed by applying pressure, whereas the journal parts themselves are only deformed elastically, and as a result of their springback, they provide the necessary adhesion for the connection. Prior to being joined, the bearing journals and crank journals may be provided with bearing bushes of a material having better tribological properties and/or undivided roller bearings and also undivided connecting rods. Lubricating channels provided in the webs, annular spaces remaining between the sleeves and journals and longitudinal grooves provided in the former permit continuous lubrication of the bearing faces. Key teeth provided at the parts to be joined ensure accurate orientation of the parts relative to each other. The expanding pressure devices may be inserted into the interior of the sleeves through apertures provided in the webs. The process is also suitable for producing crankshafts whose bearing and crank journals overlap in the axial direction. Further stages of the process permit a reduction in the number of operations and relate to the arrangement of intermediate layers which improve adhesion or the leakproofness between the parts.

2 Claims, 5 Drawing Sheets

PROCESS FOR PRODUCING ASSEMBLED CRANKSHAFTS BY EXPANDING SLEEVES ARRANGED IN DIVIDED JOURNALS

This is a continuation application of Ser. No. 07/268,229, filed Nov. 7, 1988, abandoned.

BACKGROUND OF THE INVENTION

The invention relates to a process for fabrication of crankshafts for piston engines from formed pieces, comprising respectively a crank web and a portion of the journal. Crankshafts for smaller piston engines especially auto and diesel engines are often produced in one piece by either being cast as ingots or drop forged. The bearing journals are subsequently machined and finally hardened. Because this work has to be carried out on a workpiece which is otherwise finished, it is relatively expensive. Crankshafts for larger engines, on the other hand, are assembled from individual parts such as are available taking into account production technology facilities. Typical solutions are given in DE-B-16 25 579 where the joint between the two parts extends through the webs and in DE-B-20 23 364 where the journals are divided. The individual parts are always connected by welding, even in those cases where the crankshaft is to be assembled according to DE-C-498 170 from pressed plate metal parts positioned side by side. The person skilled in the art also knows from DE-C-848 728 that in order to save weight, the crankshaft may be hollow and that the journals and webs may be made from different materials, each of which is better suited for accommodating the different specific loads. From DE-A-19 22 488 an intermediate layer is known which serves to improve the adhesion between the individual parts connected by electron beam welding. DE-A-19 51 097 shows that before the individual parts are assembled, a finished driving element (in this case a gear) may be slid onto one of them and then fixed. In the same publication a person skilled in the art will find the proposal to design the individual parts at the separation faces in such a way that prior to welding they may be inserted into each other to provide an assembly aid.

For connecting the crankshaft to the pistons it is common to use divided connecting rods which are also relatively expensive to produce and require special attention in the course of assembly in order to achieve accurate concentric running of the journals, especially if the frequently used friction [or plain] bearings are replaced by roller bearings. The process of fixing tubes in the boreholes of other parts by expanding the former is known from heat exchanger technology, with both mechanical and hydraulic expanding devices being used.

In German application DE 37 37 601.2 is described a process for producing assembled crankshafts from individually fabricated and subsequently assembled webs and journals in the case of which the journals designed as hollow cylinders are plastically deformed by being expanded and made to contact the respective bores in the webs, with the latter being deformed elastically. This process is suitable for those crankshafts where the crank and bearing journals do not overlap in axial projection. Such crankshafts, even if they are produced in one piece, are subject to loads adversely affecting the strength of the parts, which is the reason why recently so-called short stroke engines have been given preference in the case of which the crank webs are shortened and the crank and bearing journals if necessary increased in diameter to such an extent that the latter partially overlap in axial projection.

SUMMARY OF THE INVENTION

The present invention is suitable for producing crankshafts of the last mentioned kind. It is an object of the present invention to provide a more cost-effective process for producing assembled crankshafts in the case of which the individual parts may be made of materials which are particularly suitable for different specific loads to be expected. The individual parts will be finish-machined prior to being joined so that apart from straightening and precision-alignment no subsequent machining is required. The crankshafts produced in accordance with the invention will be provided with lubricating channels which are simple to produce and will also have good emergency running properties. As the production process is accompanied by the installation of driving elements such as bearings and connecting rods, these will at the same time be simplified and imparted improved running properties.

The solution of these claims is achieved by sliding the journal parts of respectively adjacent formed parts upon a common sleeve and the sleeves are plastically deformed by widening while the journal parts are elastically deformed in a permanent manner. Because the individual parts forming the crankshaft each comprise a crank web (which, with very large engines, may itself be divided into individual parts) and also part of a journal, the latter may be joined by a sleeve even if the journals overlap in the axial projection. Due to the elastic deformation of the journal parts, these spring back onto the sleeve after completion of the expanding process, thereby producing a connection which withstands even the high torques to be transmitted.

If specially formed individual parts are used which have apertures in the webs [or cheeks] with a diameter at least equal to the inside diameter of the sleeves, the expansion process may be effected by a hydraulic expanding probe axially inserted into the sleeves, such as they are already used for fixing heat exchanger tubes in their tube bases. If in view of the different loads, different materials are to be used for the crank webs and the projections of the journals than for the central part of the latter, it is advisable to utilize inserted additional journal parts in between the journal parts placed between the webs. To simplify the process it is proposed that the inserted journal parts should form part of the sleeves serving for the connection. This means, as will be more particularly explained later, that an embracing of the journal extension [or projection], and with this a more extensive area connection between the two parts is achieved.

Because the additional journal parts have different material properties than the remaining portion of the sleeves, a further optimization of the material properties of the individual regions of the crankshaft can be achieved, wherein for instance lubrication of the crankshaft is improved by a special bearing bush made of sintered metal possibly impregnated with a solid lubricant. If such a bearing bush is already part of the sleeve, it can be integrated into the crankshaft design particularly easily.

Because the bearing journal parts are slid upon a continuous sleeve common to all, and this sleeve is severed, after fastening of the formed parts upon it, in an area "d" which is to be kept free for the con rods, a good alignment of the bearing journals with each other is achieved. Furthermore the process of expanding the bearing journals and aligning the crank journals can be completed in one operation, similar to the method proposed by the applicant in EP-A-0 213 529 for fixing driving elements such as cams, gears or bearing shells on a hollow shaft.

Because there exists an interaction between the wall thickness of the sleeve and that of the journal and the adjoining web in the sense that the greater thickness (resulting from the latter) of the material to be expanded elastically causes a reduction in the part to be expanded plastically, it is proposed to utilize sleeves having a cross-section tapering towards their ends. By pressure application which varies axially this interaction can also be taken into account, so that a uniform adhesion between the parts to be fitted is also achieved in this case.

The special design proposed for the journal parts and sleeves makes it possible to supply all bearing faces of the crankshaft with lubricant simultaneously; in the case of the crankshafts produced in accordance with the state of the art, some of the lubrication channels have to be provided subsequently, which causes difficulties and results in increased production expenditure.

The use of bearing bushes which are slid on enables manufacture of the bearing faces of material which is particularly suitable from the point of view of its tribological properties. As already mentioned above, this material may be a sintered material impregnated with solid lubricant which ensures a uniform supply of lubricant to the bearing face and good emergency running properties.

To permit the bearing bushes to be positioned on the journals in the finish-machined condition, only those parts of the bearing bushes should be included in the expansion process which are positioned outside of the actual bearing face. For this purpose they may be provided with collars outside the bearing faces or, depending on their arrangement, they may be tapered at their ends.

In accordance with a preferred embodiment undivided roller bearings may be fitted on the journals or bearing bushes prior to assembly. As the joining process takes place without the application of heat and as there is no risk of material being ejected from the welded area, a risk which even with progressive welding techniques cannot be completely eliminated, the bearings are not endangered. It is possible to slide undivided connecting parts onto the journals simultaneously with the roller bearings proposed above. Because the crankshafts produced in accordance with the process in the invention have been improved to such an extent, that their service life is no longer the limiting factor of the durability of the entire engine, there is no longer any need for repair work involving dismantling of the connecting rods. A fitting process of associated journal parts serves as an assembly aid in that it automatically and accurately orients the parts relative to each other eliminating any complicated alignment operations.

If the bearing bushes are supercooled prior to fitting their subsequent expansion when warmed to room temperature leads to a particularly firm fit on the journals.

The sleeves to be expanded can be formed into indentations (possibly in the form of groves wedge-shaped in cross-section). In the process they automatically contract in the axial direction. The prestress produced in this manner is opposite in direction to any forces possibly acting from the outside, which are directed towards pulling the joined journal parts apart. The interlocking connection produced in this manner provides the joint of journal parts and sleeves with additional resistance.

The entire unit is stiffened if the open ends of the sleeves are closed with covers after expansion. The hollow space produced in this way may also be used as a lubricant reservoir.

A preferred embodiment of the invention will be discussed in detail below in connection with the accompanying drawings.

DETAILED DESCRIPTION OF THE PREFERRED EMBODIMENTS

Figure 1:
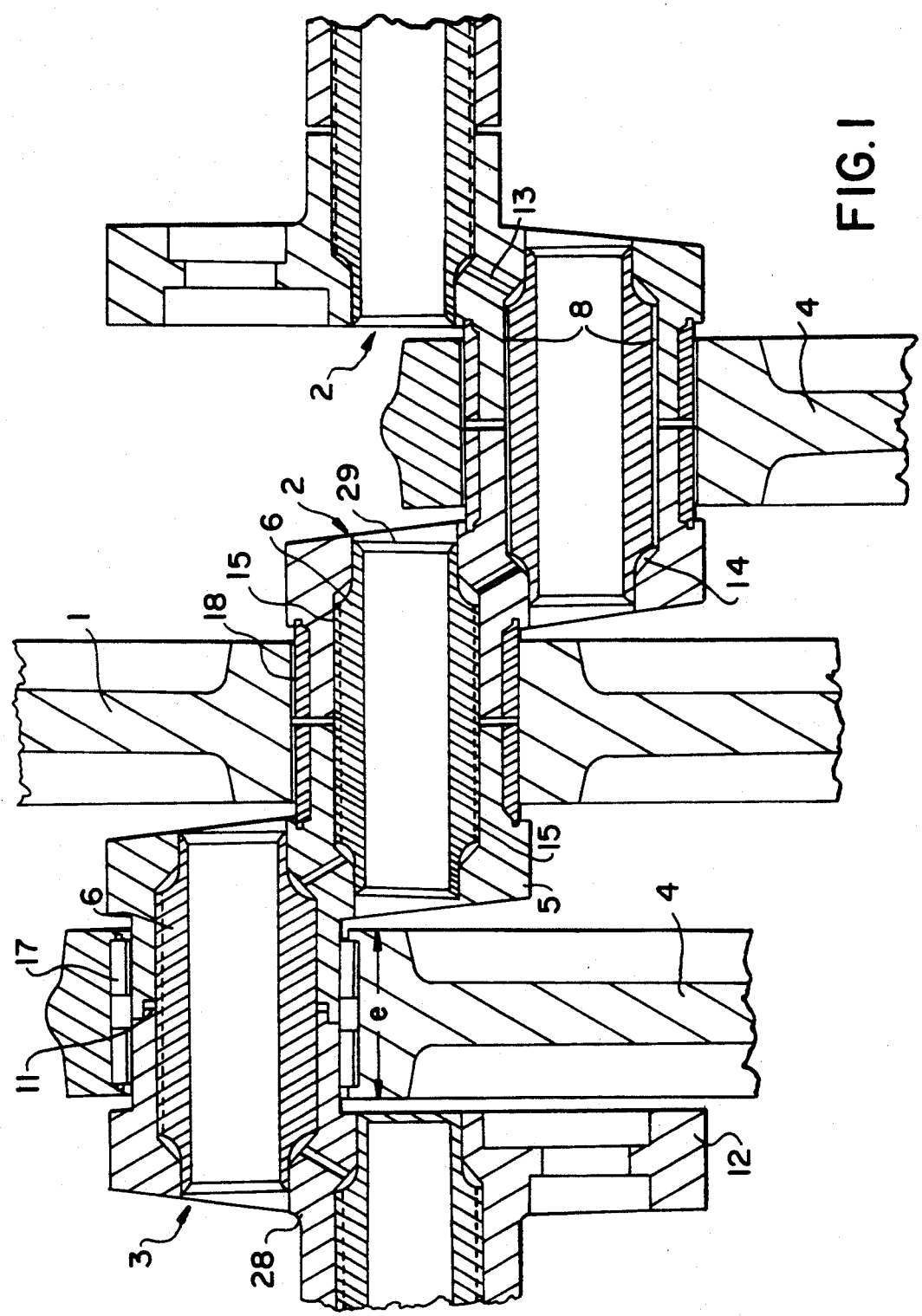
FIG. 1 shows a crankshaft combining three embodiments and longitudinal axial sections of the parts involved.

In a housing 1 of a piston engine of any type, bearing journals 2 support a crankshaft which furthermore comprises crank journals 3 on which undivided connecting rods 4 are supported. This is achieved in that always one half of a bearing journal 2 and of a crank journal 3, together with a web 28 connecting them, constitute a formed piece 5 produced by casting or forging. For assembling the entire crankshaft, the necessary number of formed pieces 5 are connected to each other in that they are slid onto a sleeve 6 in pairs, with the sleeve 6 subsequently being expanded through the application of internal pressure. This process is preferably carried out by means of a hydraulic pressure device 7 introduced through an aperture 29 provided in the web 28 and it is continued until the sleeve 6, through plastic deformation, comes to rest against the inside of the bearing journal projections integrated into the formed pieces 5, with the latter also being deformed, but only elastically. As a result of the spring-back force of the formed pieces 5 a connection is achieved which is sufficiently firm for all load cases. The aperture 29 does not have to extend coaxially relative to the journals 2, 3, as shown in the drawing.

In the interest of an optimum stress distribution, an eccentric arrangement may also be advantageous. The torsional strength of the connection can, if necessary, be increased by providing between the sleeve and journal a layer 8 consisting of a hard, grainy material such as corundum which leads to a close engagement between the two parts (shown to be excessively thick in the drawing). For the same purpose, the parts to be joined at the contacting surfaces may be provided with grooves 9 or the like.

To place the connection under axial pretension, the formed pieces 5, in the region of the journal projections, may be provided with continuous indentations or grooves 10 which do not have sharp edges. During the expanding operation, the material of the sleeve 6 is pressed into these indentations, which leads to a pretension acting in the direction of an axial contraction which further consolidates the connection.

At the faces to be joined, the formed pieces 5 may be provided with key teeth 11 which ensure that the individual formed pieces 5 can be fitted together only in their correct orientation relative to each other. The formed pieces 5 may, in the usual way, include the necessary counterweights 12. Furthermore, the formed pieces 5 are provided with lubricating channels 13 ending in continuous annular spaces 14 occurring between the sleeves 6 and the formed pieces 5 by forming these accordingly. The sleeves 6 are additionally provided with longitudinal grooves 15 as a result of which a connection between two adjoining annular spaces 14 is achieved. In this way, a continuous path is formed for the circulation of lubricant in the crankshaft.

The supply of lubricant to the connecting rod bearings designed as friction or roller bearings 17 may be effected in the conventional way via radial lubricant apertures 16. However, it is also possible to provide special bearing bushes 18 which were positioned prior to the parts being joined and which are produced of a sintered metal which, due to its porosity, ensures a uniform distribution of the lubricant and which, in addition, may be impregnated with a solid lubricant as a result of which the bearings obtain good emergency running properties. Outside the actual bearing face taken up by the bearing partner, the bearing bushes may comprise collars 30 or, vice versa, they may have a reduced wall thickness at their ends (see FIG. 4, bottom, right-hand side). In this way it is also possible to select the most suitable materials for the formed pieces 5 and the bearing faces, just like in a further embodiment in the case of which additional journal parts 19 are inserted between the formed pieces 5, which form part of the sleeves 6 and may be used for embracing the journal projections, as a result of which the contact face available is increased. However, the additional journal parts 19 may also deviate in their material properties from the sleeves 6 by producing the latter, for example from a relatively soft, tough steel, with parts of hard cast steel with better tribological properties being cast onto it.

Figure 3:
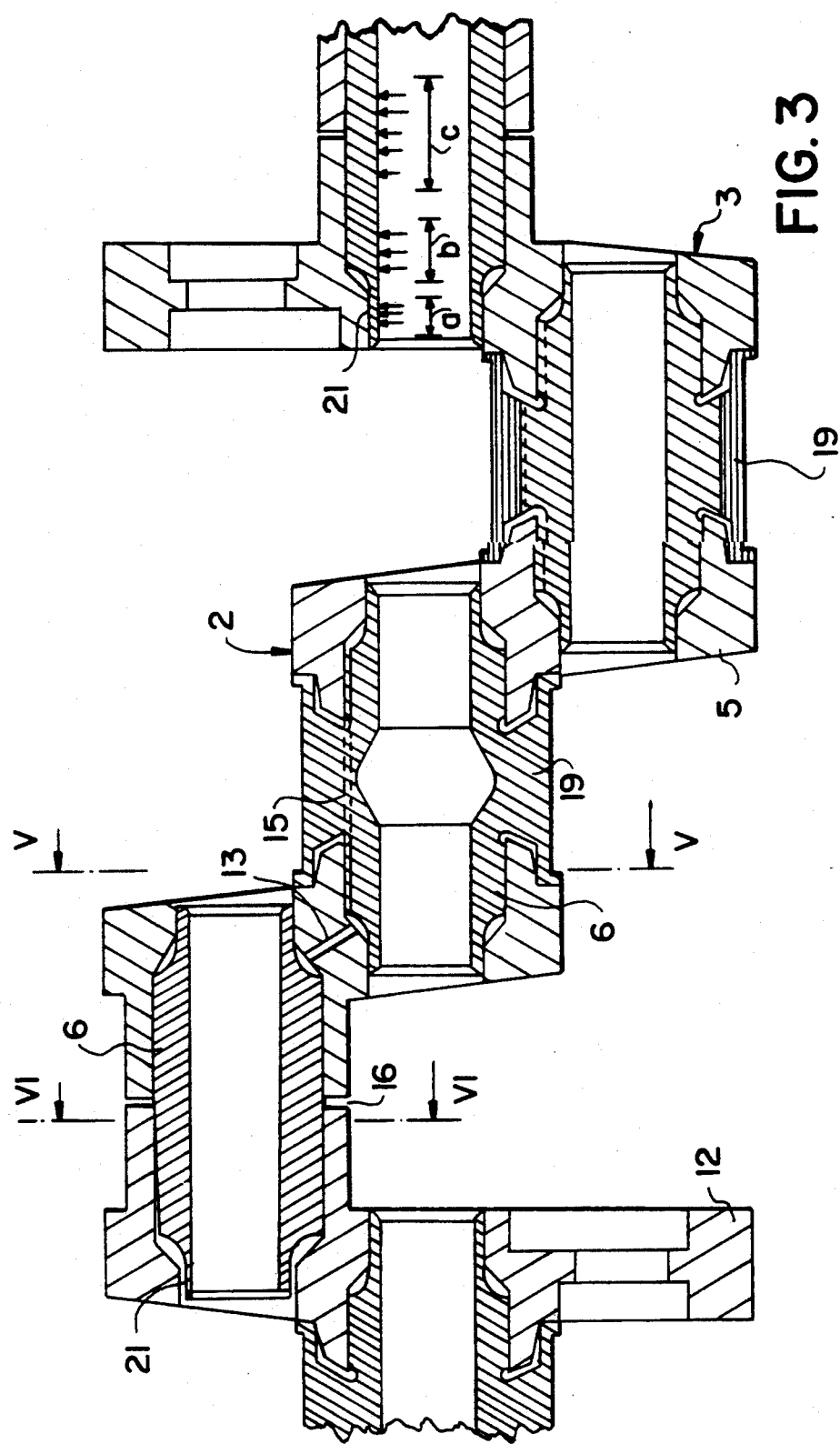
FIG. 3 shows further embodiments in longitudinal axial sections along lines III—III of FIGS. 5 and 6.

Apart from the intrinsic properties of the materials used, the quality of the connection produced by expansion also depends on accurately adjusting the expansion pressure and joint clearance to the thickness of the parts to be joined. It therefore may be advantageous to produce the sleeves 6 with a variable cross-section by giving these (see FIG. 3, top, left-hand side), prior to expansion, the shape of a double truncated cone and providing them generally with thin projections 21 because in their region it is not so much strength aspects which are of primary importance, but reliable sealing of the annular spaces 14 against the loss of lubricant. This objective can be achieved by arranging sealing layers 20 of a ductile material such as copper between the sleeve projections 21 and the adjoining parts of the formed pieces 5.

As an alternative, or additionally, it is possible to axially vary the expansion pressure; for example, in the portion referred to as "a" (see FIG. 3, top right-hand side), the expansion pressure may be kept low because even under a lower expansion pressure the respective sleeve projection 21 is deformed sufficiently. However, in the portion referred to as "b", a very high pressure may be applied, because for reasons of strength, both the sleeve 6 and the opposite part of the formed piece 5 have a relatively great thickness, whereas in the region referred to as "c" and positioned in the center of the journal, a mean expansion pressure may be sufficient because in this area the part of the formed piece 5 to be expanded is thinner. To be able to achieve such different degrees of expansion, the expanding device 17 (shown in a simplified form), in addition to the familiar devices for generating pressure not illustrated, comprises a probe member 22 containing at least one supply line 23 for the pressurized fluid. From this supply line 23, there branch off branches 24 through which the pressurized fluid enters operating portions 25 which are axially limited by continuous seals 26. If in different regions a, b, c to be expanded, different pressure levels are to be applied, this is achieved by as many different supply lines 23 as needed or these are operated successively with the same operational portion 25 axially displaced along the path in question, with changing pressure being applied.

Figure 2:
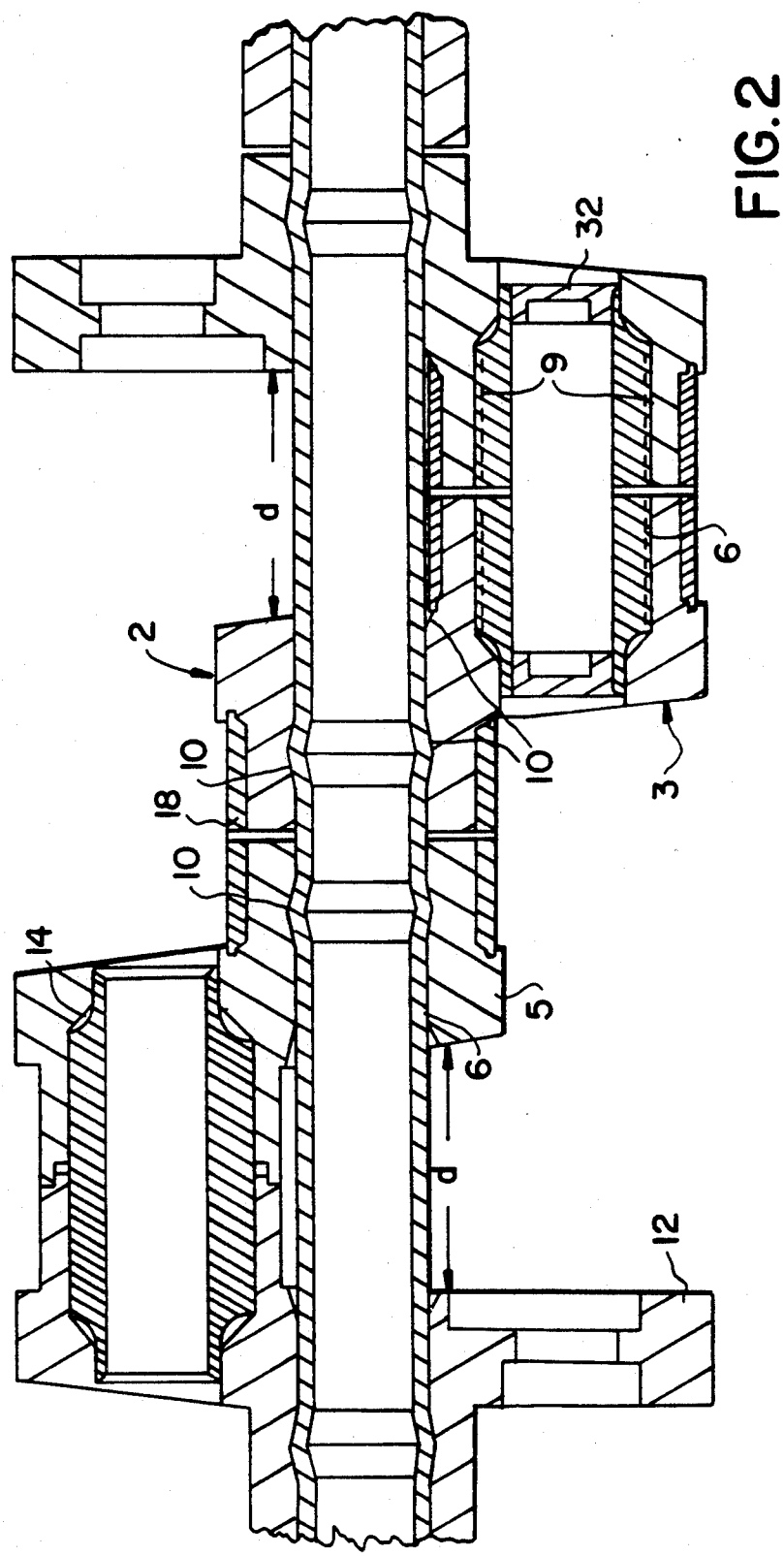
FIG. 2 illustrates further embodiments in longitudinal axial sections.
Figure 4:
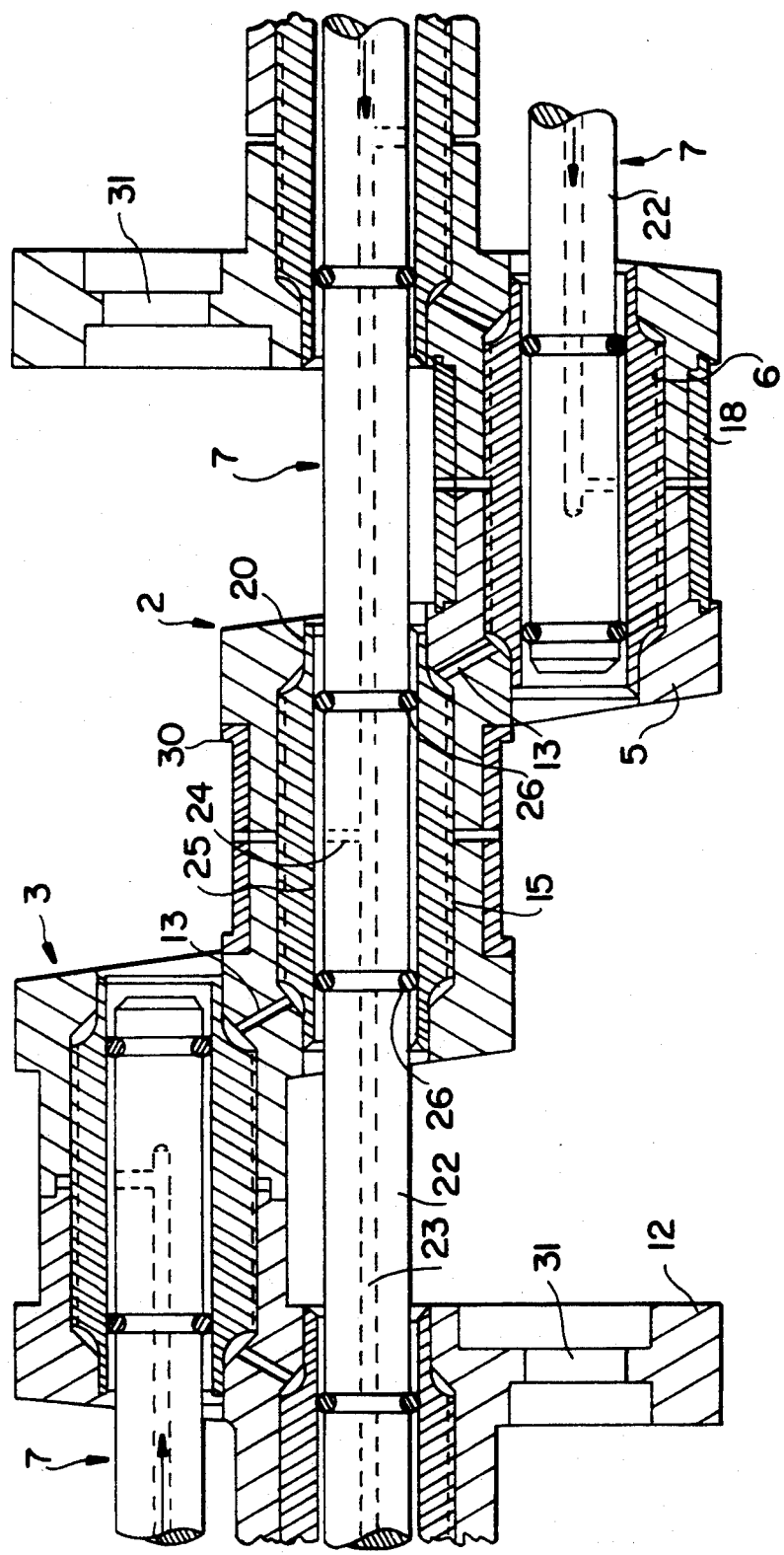
FIG. 4 again shows different embodiments.
Figure 6:
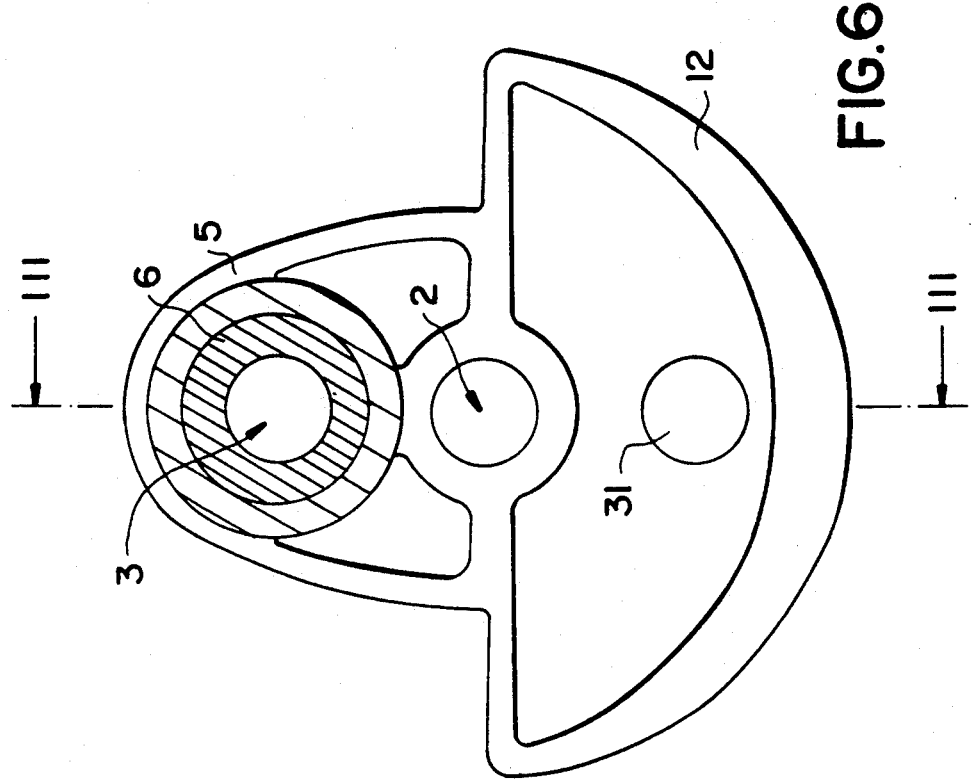
FIGS. 5 and 6 are cross-sections along lines V—V and VI—VI of FIG. 3.

As illustrated in FIG. 4, a probe member 22 may be used simultaneously for aligning journals, i.e., especially the bearing journals 2. When this probe member has been provided with the respective number of operating portions 25, for all bearing journals 2, the sleeves 6 and formed pieces 5 may be joined in one operation. For expanding crank journals 3, further probe members 22 are required or expansion has to take place in further operations to be carried out. An alternative is shown in FIG. 2 in the case of which for the bearing journals 2 one single continuous sleeve 6 is used, the various portions of which are also expanded in one single operation which also ensures accurate alignment of the bearing journals 2. Subsequently, the portions d of the sleeve 6 are separated and removed to provide space for the connecting rods 4. In a similar way it is possible to fix aligned crank journals 3 in one operation, because apertures 31 provided in the counterweights 12 permit all respective sleeves 6 to be connected to one hydraulic pressure device.

Figure 5:
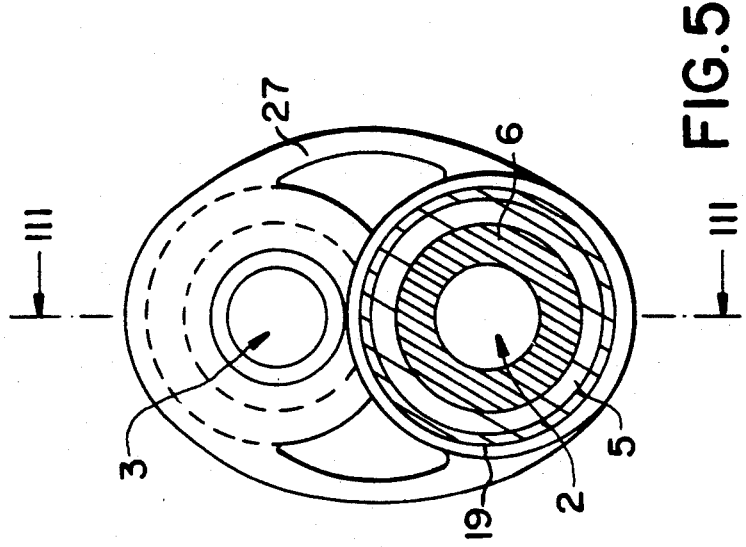

As can be seen in FIG. 5, the formed pieces 5 may be provided with brackets 27 by means of which further stiffening of the design may be achieved. As the apertures left in the formed pieces 5 for introducing the probes 22 can be relatively small, the bearing journals 2 and crank journals 3 may overlap in the axial direction, such as is required for crankshafts used in modern short-stroke engines. In the case of the crank journal 3 shown in the bottom right-hand half of FIG. 2, the ends of the expanded sleeves 6 are closed with pressed-in covers 32, for example, which do not only reinforce the entire unit, but also make it possible to use the sealed space inside the sleeve 6 as a lubricant reservoir for the bearing bushes 18, for example.

What is desired to be protected by letters patent is defined in the appended claims.

We claim:

1. A process for producing a crankshaft for a piston engine from formed pieces each comprising a crank web and part of a journal, said crankshaft having journals which are axially aligned, the process consisting essentially of:
    sliding the journal parts of a plurality of pairs of adjoining formed pieces onto respective common sleeves;
    inserting a single probe into all sleeves of those journals which are axially aligned;
    plastically deforming the respective sleeves radially inside the length of the journal parts and elastically deforming the journal parts radially through hydraulic expansion, thereby forming a friction locking connection between said journal parts and said sleeves; and simultaneously effecting said plastic deformation of the sleeves of said axially aligned journals by hydraulic pressure applied from said probe.

2. A process for producing a crankshaft for a piston engine from formed pieces, each comprising a crank web and part of a journal, and journal sleeves having axially extending annular grooves in their ends, the process consisting essentially of:

sliding the journal parts of a plurality of pairs of adjoining formed pieces onto respective common journal sleeves so that said parts are received within said grooves in the journal sleeves; and plastically radially deforming those parts of the respective sleeves that lie inside the length of the journal parts and elastically deforming the journal parts radially through hydraulic expansion, thereby forming a friction locking connection between said journal parts and said journal sleeves.

* * * * *